(12) United States Patent
Bień et al.

(10) Patent No.: US 12,494,313 B2
(45) Date of Patent: Dec. 9, 2025

(54) METHOD FOR DESTROYING SMALL ELECTRONIC EQUIPMENT, AND A DEVICE FOR DESTROYING SMALL ELECTRONIC EQUIPMENT, IN PARTICULAR THE CONTENTS OF NON-VOLATILE MEMORY

(71) Applicant: DISKUS Polska Sp. z o.o., Wieliczka (PL)

(72) Inventors: Andrzej Bień, Cracow (PL); Tomasz Filipów, Wieliczka (PL)

(73) Assignee: DISKUS Polska Sp. z o.o. (PL)

( * ) Notice: Subject to any disclaimer, the term of this patent is extended or adjusted under 35 U.S.C. 154(b) by 455 days.

(21) Appl. No.: 18/183,182

(22) Filed: Mar. 14, 2023

(65) Prior Publication Data

US 2024/0296984 A1 Sep. 5, 2024

(51) Int. Cl.
| | |
|---|---|
| *G11B 5/00* | (2006.01) |
| *B02C 19/18* | (2006.01) |
| *G11B 20/10* | (2006.01) |
| *H01F 7/20* | (2006.01) |
| *H01T 14/00* | (2006.01) |

(52) U.S. Cl.
CPC ............. *H01F 7/202* (2013.01); *B02C 19/18* (2013.01); *H01T 14/00* (2013.01)

(58) Field of Classification Search
CPC ....... G11B 5/012; G11B 5/024; G11B 5/0245; G11B 5/03; G11B 2005/0018; G11B 2005/0021; G11B 2020/10821
USPC .......................................................... 369/66
See application file for complete search history.

(56) References Cited

U.S. PATENT DOCUMENTS

2007/0047128 A1* 3/2007 Kadowaki .............. G11B 5/024

FOREIGN PATENT DOCUMENTS

PL 433348 A1 9/2021

* cited by examiner

*Primary Examiner* — Nabil Z Hindi

(57) ABSTRACT

The invention involves centric insertion of electronic equipment (26) undergoing destruction by a drawer (15) into a destroying device, into an air gap (21) between the central arms of the cores (11) of an electromagnet (10), and initiating the discharge of the accumulated electrical energy in order to destroy this electronic equipment (26) by means of a movable spark gap (14). This spark gap constitutes a moving assembly (13) comprising a motor (20) with a controller, a movable carriage (16) with an electrode (12) seated on the guides (17) of the moving assembly (13), and a fixed carriage (18) with an electrode (12).

8 Claims, 6 Drawing Sheets

METHOD FOR DESTROYING SMALL ELECTRONIC EQUIPMENT, AND A DEVICE FOR DESTROYING SMALL ELECTRONIC EQUIPMENT, IN PARTICULAR THE CONTENTS OF NON-VOLATILE MEMORY

OBJECT OF THE INVENTION

The object of the invention is a method for destroying small electronic equipment, and a device for destroying small electronic equipment, in particular the contents of non-volatile memory.

DESCRIPTION OF THE PRIOR ART

From Polish application no. P.433348 there is a known method for destroying small electronic devices, and a destroyer system for small electronic devices, in particular the contents of non-volatile memory. The method according to this application involves pulsed accumulation of electrical energy to a magnitude of no less than 100 J in a storage of this energy originating from the power supply of the destroyer, powered from the power grid or from batteries. At the same time, the device intended to be destroyed is placed manually, directly on one core of a generator of destructive electromagnetic pulses, and it is clamped by a second core, leaving large empty air gaps on both sides thereof. Subsequently, a spark is initiated by means of a fixed element triggering the destruction process, with a voltage no lower than 4.3 kV, which causes the flow of electrical destructive pulses with a current exceeding 100 A, and a duration no longer than 1 ms, across both the device undergoing destruction as well as the large empty gaps. The destructive pulses have a rise time and a fall time shorter than 20 microseconds. Control and monitoring of the destruction process proceed manually, or by means of a programmed microprocessor system.

According to application no. P.433348, the destroyer assembly has an electrical energy storage, to which the following are connected in parallel: the destroyer with the power supply, and a branch consisting of the generator of destructive electromagnetic pulses and the element triggering the destruction process, connected in series. Each element of the system is connected to a control device and/or a processor.

The electrical energy storage is a capacitor, the generator is an induction coil with a ferromagnetic core, and the element triggering the destruction process is a fixed spark gap. The ferromagnetic core constitutes two elements, each in the shape of the capital block letter 'E' with an identical length of the arms, the arms of one of them facing those of the other one.

The purpose of the invention is to develop, based on our earlier application no. P.433348, an improved method and device for destroying small electronic equipment, involving a new method for placing this equipment in the electromagnetic field of said device, and a new method for causing a discharge by means of a spark gap, in order to achieve much better effects when destroying this equipment.

DESCRIPTION OF THE INVENTION

In the method for destroying small electronic equipment, in particular the contents of non-volatile memory, involving the supply of electrical energy to a device destroying small electronic equipment, called the destroyer, zeroing it, storing electrical energy therein, placing this equipment in the area of initiation of the presence of the electromagnetic field of the destroyer, initiating a discharge of the stored electrical energy by means of a spark gap, and subjecting the small electronic equipment to the destructive action of the destructive forces of said field, and removing it from the destroyer after the end of the destruction cycle, the control and monitoring of the destruction process being performed by means of a programmed microprocessor system of a microcontroller in the electronic assembly of the destroyer, according to the invention, the placement of small electronic equipment in the destroyer involves extending a drawer from the destroyer and arranging therein a mounting adapter with the equipment to be destroyed seated therein. This adapter is placed in the nonmagnetic second part of the drawer, slideable in its first part, and arranged opposite the air gap of the electromagnet of the destroyer. Subsequently, the drawer is manually inserted into the housing of the destroyer, until a sensor signals complete insertion into this housing. This signalling means that the equipment is already in the air gap between the central arms of the cores of the electromagnet, meaning in the place in which there will be a nonpulsed, very strong, short-lasting electromagnetic field with a flow similar to damped oscillations. The discharge of the electrical energy storage is in turn initiated by moving the movable electrode of the spark gap close to its fixed electrode. Preferably, the mounting adapter along with the small electronic equipment is moved towards the inside of the destroyer, and to the end of the nonmagnetic second part of the drawer. Most preferably, the small electronic equipment with the adapter are placed in the air gap centrically between the central arms of the cores of the electromagnet, at the intersection of the central, horizontal axis of the air gap with the vertical axis of the central arms of the cores of the electromagnet, perpendicular thereto.

The device for destroying small electronic equipment, in particular the contents of non-volatile memory, called the destroyer, powered from a source of electrical energy, having in its housing an input assembly with start, power and micro-feed buttons, and a cycle counter, connected on one side to a power supply, and on the other side to an electronic control assembly comprising a microcontroller with a programmed microprocessor system, which is connected to an electrical current charging assembly, connected in turn via an electrical energy storage and a status indicator of this storage to the cores of an electromagnet in a shape resembling the capital letter E, with arms directed towards each other, connected to a spark gap, according to the invention, has a drawer for the small electronic equipment, slideable into an air gap between the central arms of the cores of the electromagnet, shorter than the outer arms. This drawer consists of three parts. The first of these parts, an outer one, is slidably mounted in the housing of the destroyer, and comprises a flat face wall connecting two lateral, elongated elements, preferably connected by a bottom, seated on the guides of the housing. The second nonmagnetic part has the shape of a box open from the side of the air gap, and it is slidably seated inside the first part. The second part may be made of plastic. The third part is in turn slideable, called an adapter, with a flat construction for seating the equipment undergoing destruction; it is placed on the bottom of the second part. On the other hand, the spark gap constitutes a moving assembly comprising a motor with a controller, a movable carriage with an electrode seated on the guides of this assembly, and a fixed carriage, also with an electrode. The charging assembly of the destroyer may constitute a contactor, a transformer, and a rectifier connected in sequence. Preferably, between the lateral elongated elements of the first part of the drawer, the destroyer has a transverse bearing plate cooperating with a sensor for signalling the insertion of the drawer into the housing, and at the same time into the air gap. Preferably, the cores of the electromagnet can be made of transformer steel sheets.

The advantage of the invention is a new method and device enabling precise, centric insertion of small electronic equipment intended for destruction into an air gap between the cores of the electromagnet of the destroying device, and focusing maximum destructive energy on said equipment. This precision has been achieved due to the use of a drawer introducing this equipment into the area of destruction, and the use of a new shape of the cores of the electromagnet, eliminating the air gap between the outer arms of the cores, thus limiting the air gap to just the central arms of these cores. In addition, they ensure exemplary adjacency of the outer arms to each other, and more secure mounting of the equipment undergoing destruction, as well as higher accuracy and reliability of operation than in previous solutions, as a result of maintaining the air gap within the assumed dimensions, which translates into better efficiency of the device. The second advantage of using said drawer is allowing for, without direct contact with the core and wires of the electromagnet coil, easier, simpler and more secure placement of the equipment undergoing destruction in the electromagnetic field in a repeatable manner. Unlike before, the second part of the drawer made of plastic rather than metal in turn causes the flow of almost all of the current through the equipment undergoing destruction, not through the entire area of the air gap also formed by the outer arms of the electromagnet, which additionally contributes to better destruction of said equipment. On the other hand, when using the new construction of the spark gap in the form of a moving assembly, its movable carriage moves sufficiently fast, so that the discharge takes place due to the contact of the electrodes, not their approach. Because the electrodes contact each other, there are smaller energy losses, since an arc discharge does not occur, and the current flows via a conductor, meaning the electrodes, translating into very good results of destroying the electronic equipment. The formation of a coil on the cores made of transformer steel sheets in turn contributes to the generation of an electromagnetic field which is stronger and faster than before, which also translates into the stability of destruction, in particular in the case of more durable elements. The performed and documented prototype and experimental tests confirmed the full usefulness of the adopted assumptions and the formulated solutions, which resulted in irreversible damage to not just the data contained in said equipment, but also the structures of integrated circuits.

BRIEF DESCRIPTION OF FIGURES

The object of the invention will be explained more closely in embodiments in the drawing, in which.

EXAMPLE 1

Figure 1:
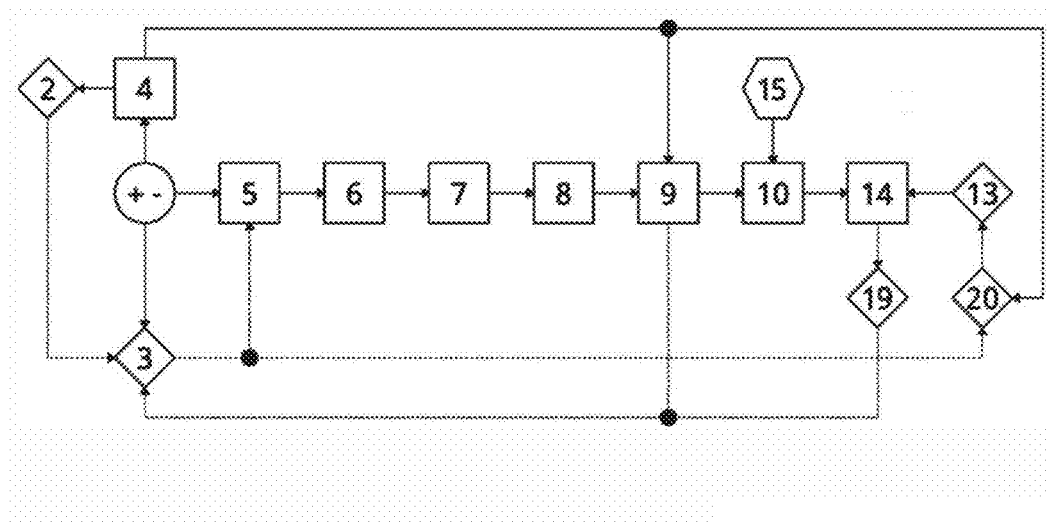
FIG. 1 presents a block diagram of the device for destroying small electronic equipment.
Figure 2:
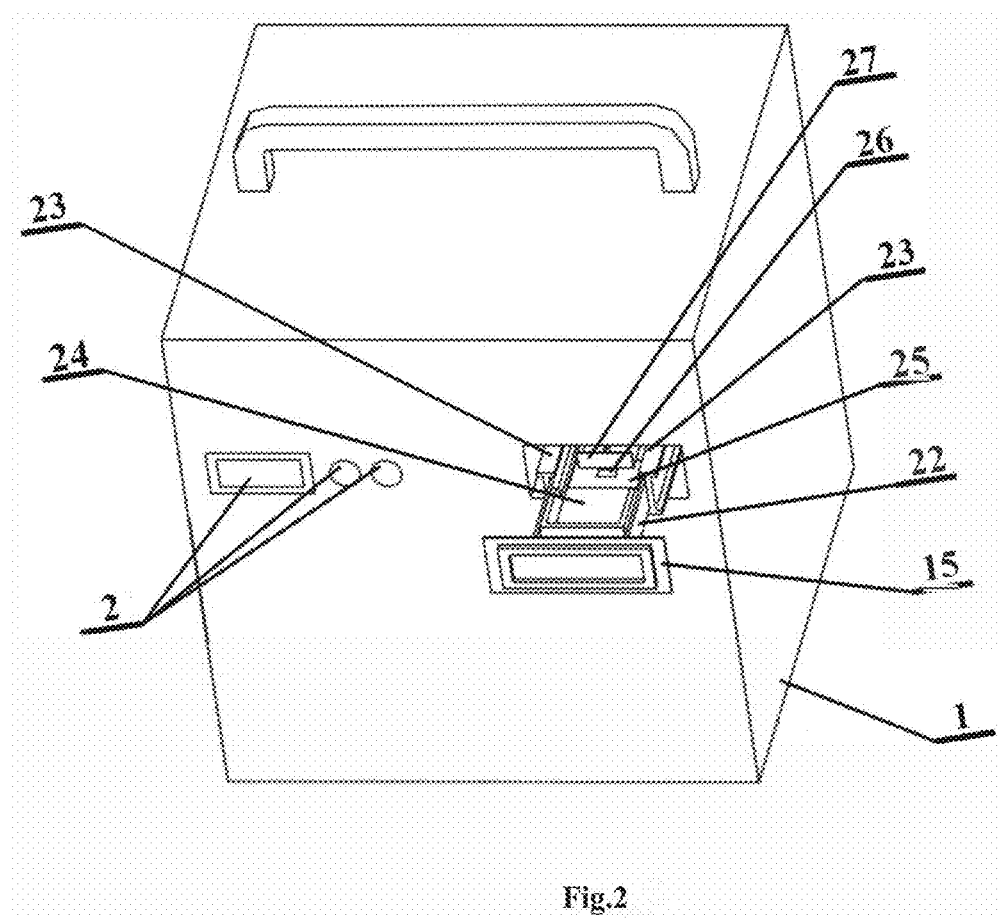
FIG. 2 presents the device in an axonometric view.
Figure 3:
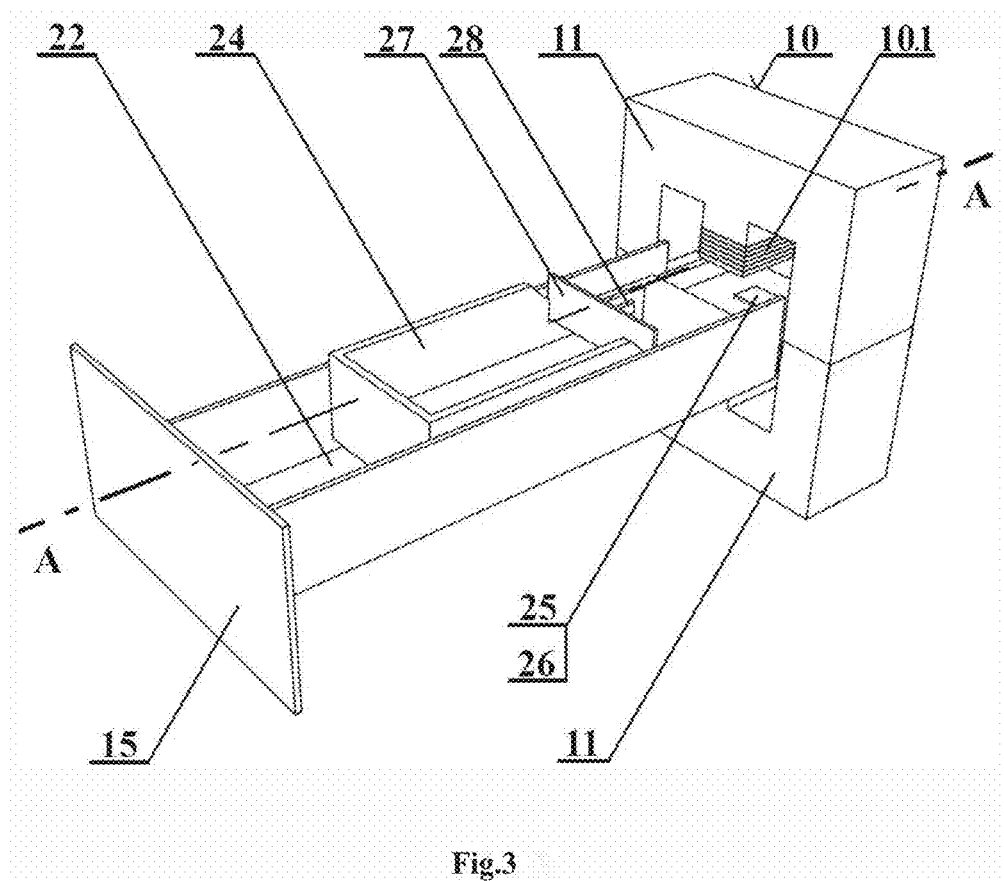
FIG. 3 presents in an axonometric view the drawer with the electromagnet.
Figure 4:
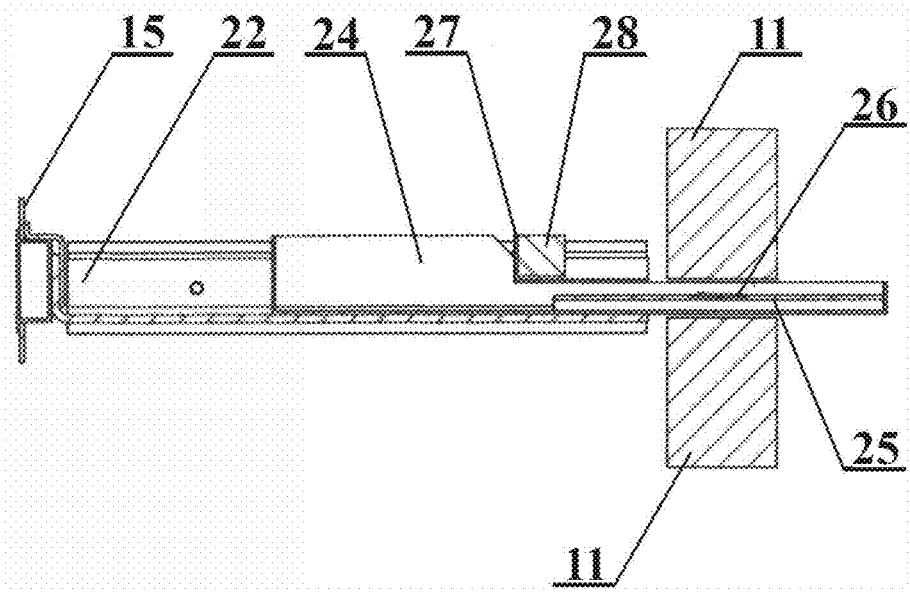
FIG. 4 presents the cross-section A-A of FIG. 3.
Figure 5:
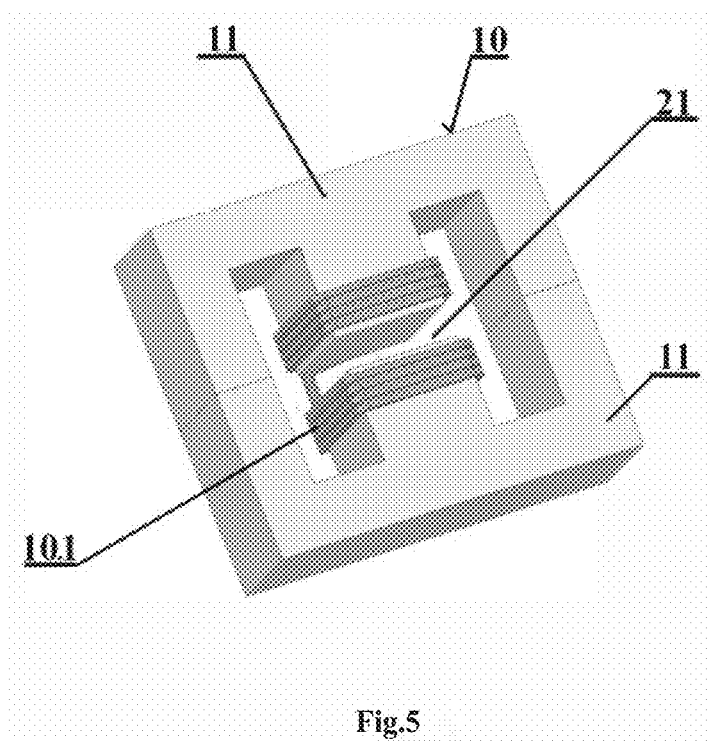
FIG. 5 presents the electromagnet in an axonometric view.
Figure 6:
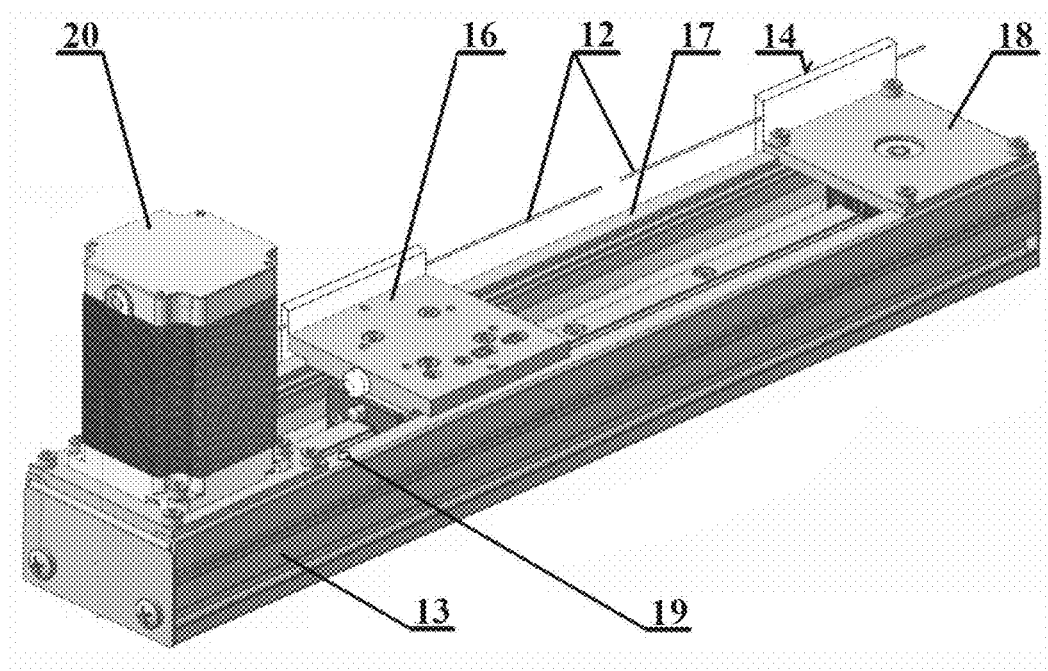
FIG. 6 presents in an axonometric view the moving assembly of the spark gap.

In the first step, the method involves supplying a 230 V AC current to the input assembly 2 of the device for destroying small electronic equipment, hereinafter called the destroyer, by a power button in this assembly 2. Upon activation of the current, an electronic control assembly 3 is activated, with a microcontroller constituting a Nucleo control board, programmed according to an algorithm developed earlier, along with a power supply 4. Subsequently, all systems of the block diagram of the destroyer are checked, including an electrical energy storage 8 constituting a capacitor, and the charging thereof, and the correctness of their operation is confirmed by a green diode lit in the input assembly 2, while a red diode lit therein signals damage and a need for repair. Upon said checking, in the second step, a signal is sent by the electronic control assembly 3 to the controller of the motor 20 of a moving assembly 13, about the ability to begin operation, which activates this motor 20 and zeroes the position of the moving assembly 13 of a spark gap 14, enabling a discharge of the electrical energy storage 8. In the third step, a drawer 15 is extended manually from the housing 1 of the destroyer, and a plastic second part 24 with a mounting adapter 25 is moved against its face wall with a holder in a first part 22. Subsequently, upon inserting the small electronic equipment 26 into the mounting adapter 25, it is moved to the end of the second part 24 of the drawer 15 from the side of the electromagnet, upon which the drawer 15 is pushed manually into the housing 1, until it is resisted by the bearing plate 27 of the drawer 15, and a sensor 28 signals its full insertion into the housing 1, including insertion precisely into the middle of an air gap 21 between the central arms of cores 11, in which area a short-lasting, strong electromagnetic field will appear. The sensor 28 informs the electronic assembly 3 about closing the drawer 15. As long as the drawer 15 is open, the device remains locked, and it is impossible to perform the work cycle. In the fourth step, the green button is pushed in the input assembly 2, which causes the electronic control assembly 3 to activate an electrical current charging assembly, which consists of: a contactor 5, a 1 kVA transformer 6, and a rectifier 7. The activation of this assembly 5, 6, 7 starts the process of charging the electrical energy storage 8 constituting a capacitor with capacitance of 51.25 µF. It is charged to reach a voltage of approximately 4500 V, and an energy of approximately 520 J. Upon reaching the input charge threshold, information about this is sent in the fifth step by an indicator 9 to the control board of the electronic assembly 3, which subsequently transmits a signal about the necessity of its activation to the controller of the motor 20 of the moving assembly 13 of the spark gap 14. Then, the moving assembly 13 causing the contact of the electrodes 12 of the spark gap 14 is activated by means of the motor 20, which results in a rapid discharge of the electrical energy storage 8 constituting a capacitor, and the creation of a strong electromagnetic field by an electromagnet 10. This field leads to the induction of current in the electronic circuits of the equipment 26 undergoing destruction, which directly causes damage to the inner structures of this equipment 26. The current flowing when discharging the electrical energy storage 8 from a voltage of 4500 V reaches a peak value of 14 kA and a frequency of 12.5 kHz, and the short-lasting electromagnetic field during the flow of the current has a value of less than 2 teslas. Generally, discharging begins after exceeding the minimum gap, which for 4500 V corresponds to approximately 4.5 mm. However, the movable carriage moves so fast that discharging takes place due to the contact of the electrodes, not their approach. Because the electrodes 12 contact each other, there are smaller energy losses, since an arc discharge does not occur, and the current flows via a conductor, meaning the electrodes. In the event of a failure to discharge the electrical energy storage 8, a red diode of the micro-feed button is lit in the input assembly 2, which button when pushed enables manual activation of the moving assembly 13 and causing the discharge of the electrical energy storage 8, and, as a result, the destruction of the device 26. In the sixth step, upon discharging the electrical energy storage 8, the position of the moving assembly 13 controlling the moving electrode 12 of the spark gap 14 is zeroed, and the status of the capacitor, meaning the electrical energy storage 8, is checked, and the reading of the cycle counter of the input assembly 2 is increased. The utilised counter counts up, which enables access to information about the cycles completed by the destroyer. Once these operations are completed, the green diode of the start button is lit, and the operator of the device then extends the drawer 2 from the housing 1, removes the destroyed equipment 26 therefrom, which ends the cycle of implementing the method for destroying the equipment 26.

EXAMPLE 2

In the housing 1, the device has an input assembly 2 with start, micro-feed and power buttons, and a cycle counter, connected on one side to an electronic control assembly 3 comprising a microcontroller constituting a Nucleo control board programmed according to an algorithm prepared earlier, and on the other side to a power supply 4 for converting the 230V AC voltage into a constant voltage of 12V DC, and powering the electronic elements. The electronic control assembly 3 is connected in the housing 1 to a charging assembly, constituting a contactor 5, a transformer 6, and a rectifier 7 connected in sequence. The charging assembly 5, 6, 7 is in turn connected to an electrical energy storage 8 in the form of a capacitor. The charging voltage of the electrical energy storage 8 is read by an indicator 9.

The function of the electrical current charging assembly 5, 6, 7 is to generate such a voltage, preferably 4500 V, so that the electrical energy accumulated in the storage 8 would be capable of total destruction of the contents of the non-volatile memory of the equipment undergoing destruction. The charging assembly 5, 6, 7 is subsequently connected via the electrical energy storage 8 and the status indicator 9 of this storage 8 to the coil 10.1 of an electromagnet 10 wound onto cores 11 made of transformer steel sheets. The cores 11 have shapes resembling the capital block letter 'E', with an identical length of the outer arms and a shorter length of the central arms, and the arms of one of them face those of the other one. Three windings of the coil 10.1 are wound onto each central arm of the cores 11 with two wires with a cross-sectional area of 4 mm2, connected in parallel. The coil 10.1 of the electromagnet 10 is also connected to electrodes 12 in the moving assembly 13 of a spark gap 14. The moving assembly 13 of the spark gap 14 has a movable carriage 16 slideable on guides 17, and a fixed carriage 18. The electrodes 12 of the carriages 16, 18 cause discharging of the electrical energy storage 8 at the moment of their contact. The moving assembly 13 also has a sensor 19 of the position of the movable carriage 16, and a motor 20 activated by its controller. On the other hand, a drawer 15, partially slideable into an air gap 21 between the cores 11 of the electromagnet 10, consists of three parts. An outer first part 22 made of stainless steel, mounted slidably in the housing 1 of the device, resembles a furniture drawer, and it comprises a flat face wall with a holder, to which two extreme elongated elements are mounted, preferably connected by a bottom, seated on the guides 23 of the destroyer housing 1. A nonmagnetic second part 24 made of plastic has the form of a box open from the side of the electromagnet 10, and it is slidably seated inside the first part 22. On the bottom of the second part 24 there is a slideable third part constituting a mounting adapter 25, with a width equal to the width of the inner second part 24, constituting a flat construction for seating therein or thereon the equipment 26 undergoing destruction, which becomes centred in this part 24 of the drawer 15 for achieving its central position in the air gap 21 between the central arms of the cores 11 of the electromagnet 10. Between the lateral elongated elements of the first part 22 of the drawer 15 there is a transverse bearing plate 27, cooperating with a sensor 28 for signalling the insertion of the drawer 15 into the air gap 21, and the centric arrangement of the equipment 26 undergoing destruction therein. The transverse bearing plate 27 is located at a height above the equipment 26 undergoing destruction, seated on the mounting adapter 25.

What is claimed is:

1. A method for destroying small electronic equipment, in particular the contents of non-volatile memory, involving the supply of electrical energy to a device destroying small electronic equipment called the destroyer, zeroing it, storing electrical energy therein, placing the small electronic equipment undergoing destruction in the area of initiation of the presence of the electromagnetic field of the destroyer, initiating a discharge of the stored electrical energy by means of a spark gap, and subjecting the small electronic equipment to the destructive action of the destructive forces of this field, and removing it from the destroyer after the end of the destruction cycle, the control and monitoring of the destruction process being performed by means of a programmed microprocessor system of a microcontroller in the electronic assembly of the destroyer, characterised in that the placement of the small electronic equipment (26) in the destroyer involves extending a drawer (15) therefrom, inserting a mounting adapter (25) into its nonmagnetic second part (24) slideable in a first part (22), seating the small electronic equipment (26) in this adapter (25), and manually pushing this drawer (15) into the housing (1) of the destroyer, inserting this electronic equipment (26) into an air gap (21) between the central arms of the cores (11) of the electromagnet (10) in the place of the occurrence of a nonpulsed, very strong, short-lasting electromagnetic field with a flow similar to damped oscillations, until a sensor (28) signals full insertion of the drawer, and the discharge of an electrical energy storage (8) is initiated by moving the movable electrode (12) of a spark gap (14) close to its fixed electrode (12).

2. The method according to claim 1, characterised in that the mounting adapter (25) along with the small electronic equipment (26) is moved towards the inside of the destroyer to the end of the nonmagnetic second part (24) of the drawer (15).

3. The method according to claim 1, characterised in that the small electronic equipment (26) is placed centrically in the air gap (21) between the central arms of the cores (11) of the electromagnet (10) at the intersection of the central, horizontal axis of the air gap (21) with the vertical axis of the central arms of the cores (11) of the electromagnet (10) of this destroyer, perpendicular thereto.

4. A device for destroying small electronic equipment, in particular the contents of non-volatile memory, called the destroyer, powered from a source of electrical energy, having in its housing an input assembly with start, power and micro-feed buttons, and a cycle counter, connected on one side to a power supply, and on the other side to an electronic control assembly comprising a microcontroller with a programmed microprocessor system, which is connected to an electrical current charging assembly, connected in turn to a status indicator of an electrical energy storage, with the cores of an electromagnet in a shape resembling the capital letter E, with arms directed towards each other, connected to a spark gap, characterised in that it has a drawer (15) for the small electronic equipment (26), slideable into an air gap (21) between the central arms of the cores (11) of the electromagnet (10), shorter than the outer arms, consisting of three parts (22, 24, 25), the outer first part (22) of which is slidably mounted in the housing (1) of the destroyer and comprises a flat face wall connecting two lateral elongated elements, preferably connected by a bottom, seated on the guides (23) of the housing (1), the second nonmagnetic part (24) has the shape of a box open from the side of the air gap (21), and it is slidably seated inside the first part (22), while the third part, called an adapter (25) with a flat construction for seating the equipment (26) undergoing destruction, is located on the bottom of the second part (24), and the spark gap (14) constitutes a moving assembly (13) comprising a motor (20) with a controller, a movable carriage (16) with an electrode (12) seated on the guides (17) of the moving assembly (13), and a fixed carriage (18) with an electrode (12).

5. The device according to claim 4, characterised in that the charging assembly constitutes a contactor (5), a transformer (6), and a rectifier (7) connected in sequence.

6. The device according to claim 4, characterised in that between the lateral, elongated elements of the first part (22) of the drawer (15) it has a transverse bearing plate (27) cooperating with a sensor (28) for signalling the insertion of the drawer (15) into the housing (1), and at the same time into the air gap (21).

7. The device according to claim 3, characterised in that the second part (24) of the drawer (15) is made of plastic.

8. The device according to claim 4, characterised in that the cores (11) of the electromagnet (10) are made of transformer steel sheets.

* * * * *